United States Patent [19]

Holland

[11] Patent Number: 4,688,698

[45] Date of Patent: Aug. 25, 1987

[54] SEED DISPENSING MECHANISMS

[75] Inventor: Simon J. R. Holland, Newmarket, England

[73] Assignee: Stanhay Webb Limited, England

[21] Appl. No.: 906,697

[22] Filed: Sep. 11, 1986

Related U.S. Application Data

[63] Continuation of Ser. No. 668,395, Nov. 6, 1984, abandoned.

[30] Foreign Application Priority Data

Nov. 18, 1983 [GB] United Kingdom ............. 8330850

[51] Int. Cl.$^4$ .............................................. B65H 3/08
[52] U.S. Cl. ..................................... 221/211; 111/34; 111/77
[58] Field of Search .............. 221/211, 264, 265, 278, 221/266, 263; 111/34, 77, 80, 85; 156/644; 29/DIG. 16

[56] References Cited

U.S. PATENT DOCUMENTS

| | | | |
|---|---|---|---|
| 3,796,346 | 3/1974 | Ribouleau | 221/278 X |
| 4,155,801 | 5/1979 | Provancher | 156/644 X |
| 4,285,444 | 8/1981 | Tye | 221/211 |
| 4,449,642 | 5/1984 | Dooley | 221/211 |
| 4,469,244 | 9/1984 | Maury | 221/211 X |
| 4,515,291 | 5/1985 | Holmes | 221/211 |

FOREIGN PATENT DOCUMENTS 2414287  8/1979  France ............................. 111/34

*Primary Examiner*—Joseph J. Rolla
*Assistant Examiner*—David H. Bollinger

[57] ABSTRACT

A seed dispensing mechanism for a precision row crop planter employs a pressure differential to cause seeds to be held to a series of seed apertures in a rotary disc. The disc is of stainless steel of very thin gauge whereby the disc deforms under the pressure differential to provide a degree of self sealing. The apertures in the disc are formed by chemical etching. A singulator mechanism for removing excess seeds from the apertures comprises singulator members on opposite sides of the row of apertures and presenting a curved profile to the seeds and defining a throat of which the width can be adjusted by a single knob through a high ratio adjustment mechanism.

6 Claims, 12 Drawing Figures

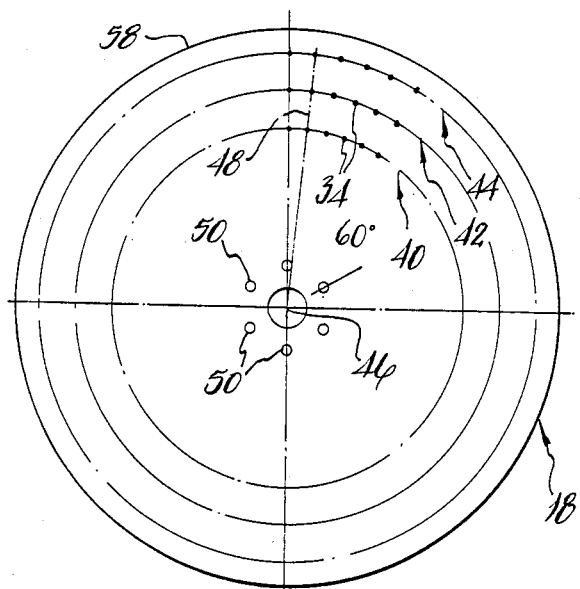
FIG.3
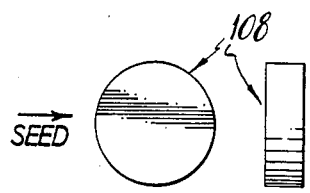 
FIG.7　　FIG.8
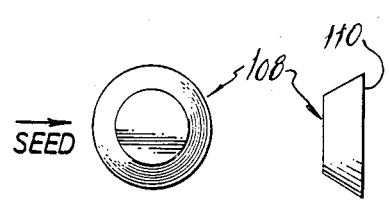 
FIG.9　　FIG.10
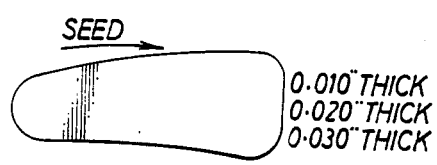
FIG.11
FIG.12

SEED DISPENSING MECHANISMS

This is a continuation of co-pending application Ser. No. 668,395, filed on Nov. 6, 1984, now abandoned.

This invention relates to seed dispensing mechanisms. In particular, but not exclusively, the invention relates to such mechanisms for use in precision planters in which seeds are selected and dispensed individually as opposed to seed dispensing mechanisms in which the rate of dispensing is controlled by varying the flow of seed. So-called precision-type dispensing mechanisms are used for dispensing seeds in drills and planters for such row crops as small bean and vegetable seeds, and natural or pelleted sugar beet, as opposed to such cereal seeds as wheat, barley and the like which are usually dispensed in a less precise way.

More particularly, the invention relates to seed dispensing mechanisms employing a pressure differential to cause seeds to be held to a series of seed apertures in a rotary member such as a plate or disc. Usually, the arrangement is such that a vacuum is applied to one side of the disc and the seeds are held against the apertures on the other side of the disc by the atmospheric air pressure. In use, the disc is rotated, seeds are picked up from a seed reservoir by the apertures in the disc, excess seeds are singulated and the individual seeds remaining on the disc are then dispensed one at a time at a discharge point located on the path of travel of the seed apertures after singulation has taken place and before the apertures re-enter the reservoir.

Such vacuum-type seed dispensing mechanisms are comparitively well known and have achieved some technical success. However, several problems remain to be solved in such mechanisms including in particular problems in relation to the disc or plate and the housing with which it co-operates, and the mechanism for singulating seeds picked up by the plates.

Firstly, there is the requirement that the seed apertures formed in the disc or plate are reliably filled as the apertures pass through the seed reservoir. Occasional misses or blanks result in corresponding gaps in the field planted, and this is unacceptable to farmers. Other problems are to some extent technically related with these and concern the manufacture of the disc or plate in a sufficiently flat or smooth condition and with the seed apertures formed with adequate precision.

As regards filling of the seed apertures in the disc, one particular problem relates to maintenance of the vacuum or pressure differential. Obviously, the sealing arrangement between the disc and its housing must be effective to allow the maintenance of a steady and adequate vacuum on the relevant side of the disc. Irregularities in the sealing arrangement will give rise to reduction of the vacuum and interference with the seed selection. Localised sealing failures, although perhaps within the capacity of the vacuum pump so far as concerns maintenance of the overall vacuum, can cause localised variations in the vacuum whereby seed selection becomes irregular.

Previously proposed solutions to this sealing problem have concentrated mainly on the provision of a seed selection disc which is precisely flat and smooth and seals effectively with the adjacent structure. However, this approach has led to the adoption of rather thick, heavy and precisely rolled and machined discs and corresponding fine tolerances on the associated structure against which they seal. This is an expensive and somewhat unsatisfactory approach to the problem and we believe that improvements in this respect are needed.

Moreover, so far as manufacture of the disc is concerned, conventionally the seed apertures have been drilled in the heavy disc described above and countersinks have been provided for each seed aperture on the vacuum side of the disc.

It will be appreciated that the drilling and countersinking of the discs in this manner tends to produce burrs and swarf which obviously must be removed before use of the disc. However, in such a cleaning and polishing operation there is a tendency for the burrs merely to be pushed back into the holes where they then subsequently interfere with seed selection. Moreover, the depth of the holes themselves, despite the countersinking, itself tends to promote the physical trapping of two or more seeds in each aperture.

A further requirement relates to the need for an efficient singulation mechanism to reduce the incidence of doubles or triples i.e. two or three seeds, or more provided in each hole in the disc. Previously proposed singulating mechanisms are somewhat simple and crude in that the mode of adjustment of the singulating action is extremely coarse whereby it is difficult to achieve the optimum setting of the mechanism for any given set of circumstances.

Clearly, improvements are needed in respect of the above-discussed aspects of the manufacture and construction of seed dispensing mechanisms.

An aim of the present invention is to provide a seed selection disc and a seed dispensing mechanism incorporating same in which at least one of the problems identified above is alleviated or overcome.

According to the invention there is provided a seed selection plate and a seed dispensing mechanism as defined in the accompanying claims.

One aspect of the invention as provided in an embodiment described below includes a seed selection plate for a differential pressure seed selection mechanism, the plate having spaced seed selection apertures formed therein, wherein the plate is flexible to the extent that the plate deforms under the pnuematic pressure differential applied thereto so as to provide a degree of self sealing with respect to a support therefor.

Another aspect of the invention as provided in an embodiment described below is a seed selection plate for a differential pressure seed selection mechanism, the plate having spaced seed selection apertures formed therein, wherein the thickness of the plate lies in the range of 0.125 to 0.625 millimeters. The plate preferably comprises a metallic material such as stainless steel.

A further aspect of the invention as provided in an embodiment described below is a seed selection plate for a differential pressure seed selection mechanism, the plate having spaced seed selection apertures formed therein, wherein the plate is formed with said seed apertures by a non-mechanical means such as chemical etching.

Another aspect of the invention as provided in an embodiment as described below is a seed selection plate for a differential pressure seed selection mechanism, the plate having spaced seed selection apertures formed therein, wherein the seed selection plate comprises stainless steel having a thickness between 0.125 millimeters and 0.625 millimeters and a flexibility such that the plate deforms under the pneumatic pressure differential applied thereto to provide a degree of self sealing, the plate having said seed apertures formed therein by non-mechanical means such as chemical etching.

Preferably, the seed selection plate comprises stainless steel of thickness between 0.2 and 0.3 millimetres.

A single row of circumferentially spaced seed apertures may be formed in the selection plate. Alternatively, two radially spaced rows or three radially spaced rows of such seed apertures may be formed in the plate.

In a seed dispensing mechanism incorporating the seed selection plate, support means for the plate and engagable therewith on the vacuum side thereof may be provided. The support means may comprise a circumferentially extending rib having a flat upper surface for engagement with the plate. The plate may be supported at or in the region of its outer periphery on an outer circumferentially extending support member formed with a flat surface for engagement with the plate. A further cirumferentially extending support member or rib may be provided radially inwardly of the outer support member. Corresponding support members may be provided between the rows of seed selection apertures. The plate support members may be mounted on a housing member having connection means thereto whereby said differential pressure may be set up across the plate.

A central turntable may be provided to support the inner region of the seed selection plate. Drive formations are preferably provided on the turntable for driving engagement with the plate.

A blanking member is preferably provided for engagement with the disc to blank-off the seed apertures on the vacuum side whereby the seeds may be discharged. Seed discharge means is preferably also provided to dislodge the seeds. The seed discharge means may provide for an air flow through the seed apertures from the vacuum side of the discs to the other side to dislodge the seeds.

A further aspect of the invention as provided in an embodiment described below is a seed dispensing mechanism comprising a rotatable seed selection member having a row of seed apertures therein to pick up seed from a supply, and a seed singulation mechanism to remove excess seed from said apertures prior to dispensing seed from the plate, wherein said singulation mechanism comprises a pair of singulator members positioned on opposite sides of said row of seed apertures and being position-adjustable towards and away from each other to adjust the singulation effect.

The singulator members preferably present a generally smoothly curved profile to the seed. For example, the singulator members may be generally cylindrical in form and arranged with their axes at right angles to the plane of the seed selection plate. The seed singulator members may be mounted on oppositely-movable supports. Preferably, a single actuator member is provided to effect said position-adjustment of the singulator members.

Preferably also, said singulator members positioned on opposite sides of said row of seed apertures are spaced apart along said row so as to act successively on seeds passing therebetween. Preferably said actuator member for the oppositely movable supports is arranged to act thereon through a high ratio drive whereby fine adjustment of the singulator members can be provided manually.

Preferably also, said oppositely-movable supports each carry two or more singulator members to co-operate with two or more rows of said seed apertures.

The invention also provides a seed selection plate and a seed dispensing mechanism comprising any novel feature or novel combination of features disclosed herein.

An embodiment of the invention will now be described by way of example with reference to the accompanying drawings in which:

FIG. 3 shows an elevation view of a seed selection plate of the mechanisms of FIGS. 1 and 2;

FIGS. 7 and 8 are plan and side elevation views of a cylindrical singulator member, six of which are seen in FIG. 6;

FIGS. 9 and 10 are plan and side elevation views of an alternative singulator member of generally frusto-conical form; and FIGS. 11 and 12 are plan views of two alternative plate-like singulator members.

Figure 1:
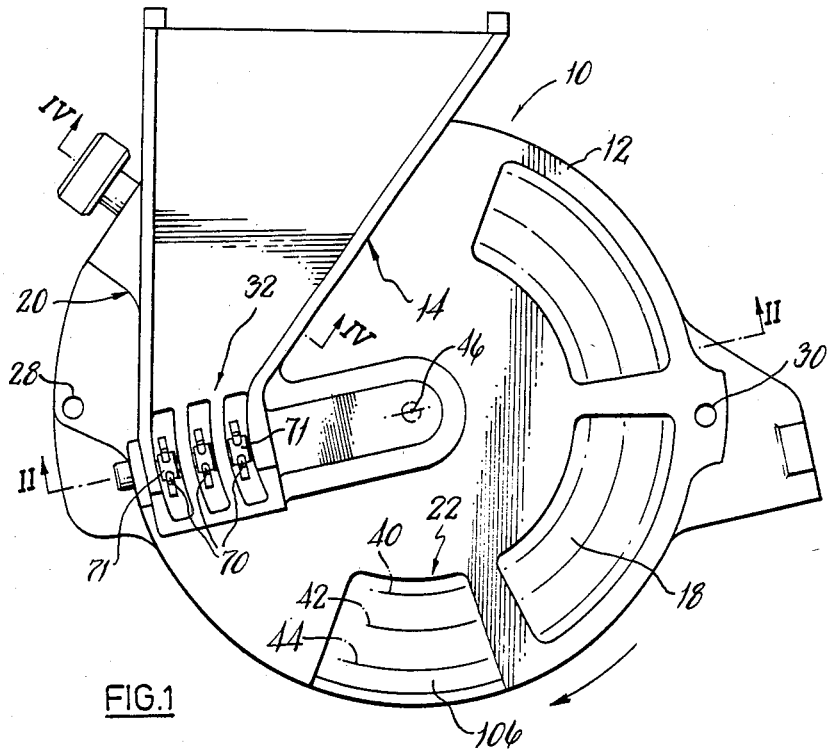
FIG. 1 shows an elevation view of a seed dispensing mechanism.

FIGS. 1 to 8 show a seed dispensing mechanism 10 which forms part of a row unit (not shown) of a precision planter (not shown). The planter is of the kind comprising a transversly extending toolbar adapted to be mounted on the hitch links of an agricultural tractor and having laterally spaced row units mounted at intervals along its length, each row unit having its own seed hopper, seed dispensing mechanism and coulter assembly and press wheel. Seeds from the seed hopper of each row unit are selected one at a time by the dispensing mechanism and dropped into a furrow opened by the coulter assembly, the furrow is then closed and the soil is pressed down by the press wheel. Such planters are used for sowing carrots, onions, lettuces and other small vegetable seeds.

A seed dispensing mechanism 10 has its own seed reservoir and discharges selected seeds into a discharge assembly (not shown) very close to the soil-opening coulter. The dispensing mechanism 10 is mounted at about 3.8 centimeters clearance from the ground whereby the seeds are discharged very close to the furrow and there is very little loss of accuracy between the dispensing mechanism and the soil itself. Moreover, the direction of rotation of the seed selection plate (described below) of the dispensing mechanism is such that the seed is dispensed with a velocity in the opposite direction to the ground speed of the implement whereby the net velocity of the seed with respect to the ground is very low.

Seed dispensing mechanism 10 broadly comprises a housing 12, a seed reservoir 14, a drive 16, a seed selection plate 18, a seed singulation mechanism 20, and seed ejection means 22.

Housing 12 is formed as an aluminium casting and comprises a vacuum side body member 24 and a seed side body member 26 detachably secured together by means of releasable fasteners at 28, 30 and having a connection pipe (not shown) on body member 24 whereby a hose is connected thereto from a vacuum pump driven by the tractor's p.t.o. (or by a hydraulic drive or other power source) and effective to lower the pressure between plate 18 and body member 24 to about 80 millibars (i.e. 920 millibars below atmospheric pressure). Housing 12 could alternatively be formed as a plastic moulding e.g. of nylon or the like.

Seed reservoir 14 is generally wedge-shaped and funnels seed down to the seed dispensing mechanism and to seed selection plate 18 in particular and is formed integrally with housing 12. Seed selection takes place in a seed selection zone 32 through which apertures 34 in selection plate 18 pass, to pick-up seeds.

Drive 16 comprises a pulley 36 driven by a belt (not shown) from a ground wheel or press wheel so as to rotate at a speed directly related to the ground speed of the planter or drill. The drive rotates seed selection plate 18 and associated components described below.

Seed selection plate 18 is shown in FIG. 3 and is in the form of a circular disc formed of grade 301 hard rolled stainless steel sheet of thickness 0.254 millimeters. The disc is of diameter 207 millimeters and is formed with three rows 40, 42, 44 of seed apertures 34 arranged coaxially with plate 18 (axis 46) and of diameters 190 and 162 and 134 millimeters respectively.

Each row 40, 42 and 44 of apertures 34 comprises sixty apertures spaced at six degree intervals around the circumference of the disc so that the apertures on the three rows are arranged in radially aligned groups as indicated by reference radius 48. It is to be understood that such an arrangement of the apertures is by no means essential.

The seed apertures 34 are each circular in shape and of diameter 0.5 millimeters and formed by a non-mechanical process of chemical etching. The etching is effected by spraying ferric chloride onto both sides of plate 18 after the latter has been appropriately masked by a photographic process so that only the desired apertures are etched. It is to be noted that the plate 18 is rolled as flat as possible prior to etching.

A series of six drive apertures 50 are formed in the central region of plate 18 to receive six corresponding drive pins 52 projecting axially from a turntable 54 driven by pulley 36 and serving to support the central region of plate 18.

Figure 2:
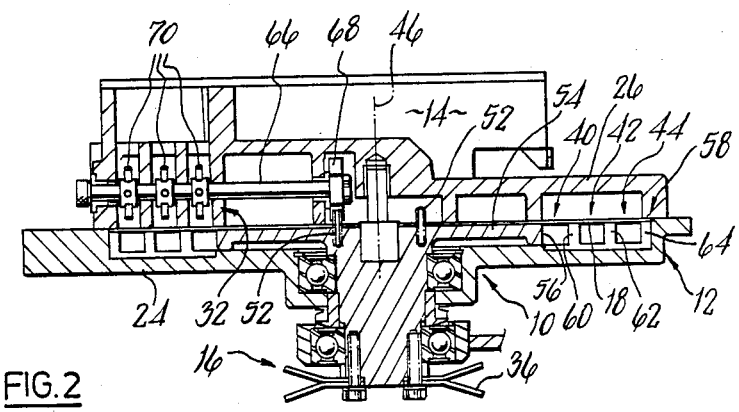
FIG. 2 shows a section on the line II—II through the mechanism of FIG. 1.

Between the outer periphery 56 of turntable 54 and the outer edge 58 of plate 18, the latter is supported against the vacuum present in the drive side of housing 12 by means of three circumferentially extending ribs 60, 62 and 64 disposed at radially spaced intervals, extending in circular paths, and each having a flat outer surface for sealing engagement with plate 18. The three rows of seed apertures 40, 42 and 44 are correspondingly spaced between the outer periphery 56 of turntable 54 and the ribs 60, 62 and 64, as indicated in FIG. 2.

Within seed reservoir 14 is provided seed agitator means comprising a shaft 66 rotated by drive pins 52 through a paddle wheel 68. The shaft carries agitator pins 70 to agitate the seed in the seed selection zone 32. Shaft 66 extends radially of seed selection plate 18 and pins 70 are mounted thereon by hubs 71. Drive apertures 50 which receive drive pins 52 are located at angular spacings of 60 degrees and thus there is a considerable amount of lost motion in the drive to shaft 66 whereby agitating pins 70 have an irregular circular motion which serves to provide a particularly effective agitating action.

Seed singulation mechanism 20 will be described in detail below and comprises adjustable mechanical means to doff or remove excess seeds from the rows of apertures 40, 42, 44 and thus leave, as far as possible, a single seed in each aperture 34.

Figure 5:
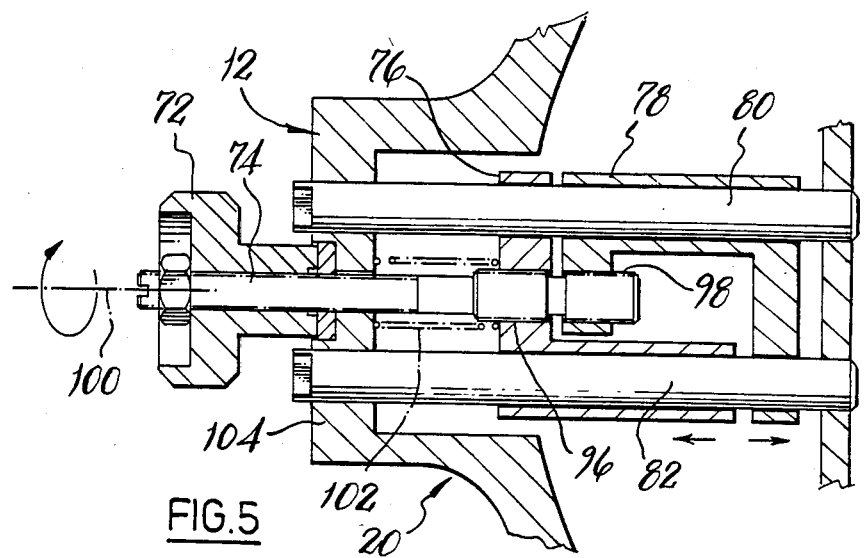
FIG. 5 shows a section on the line V—V in FIG. 4.
Figure 4:
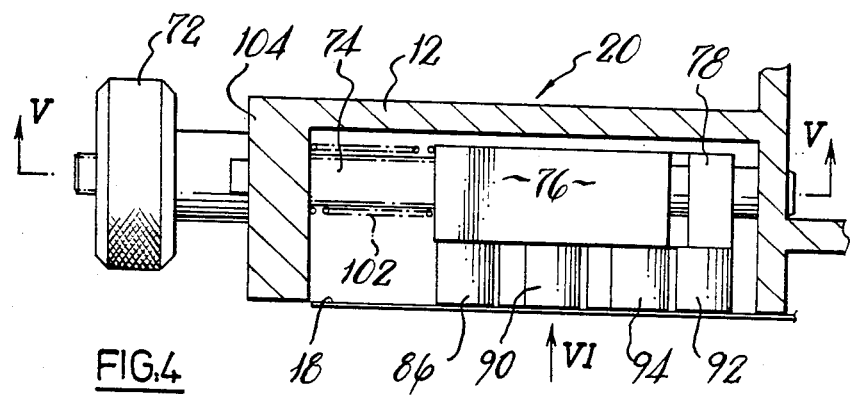
FIG. 4 shows a section on the line IV—IV in FIG. 1 through a singulator mechanism.
Figure 6:
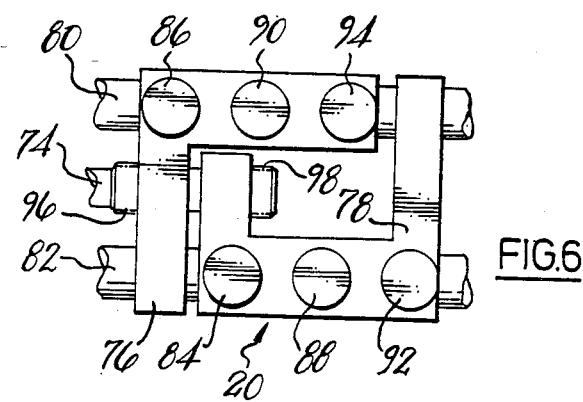
FIG. 6 shows a view of a detail of the mechanism of FIG. 4, the direction of viewing being indicated by arrow VI in FIG. 4.

Details of the structure of singulation mechanism 20 are shown in FIGS. 4, 5 and 6. The main structural components include a manual adjustment knob 72 actuating a shaft 74 connected to a pair of carriers 76, 78 which are slidably mounted on a pair of guide pins 80, 82 and carry singulator members 84, 86, 88, 90, 92 and 94. Rotation of knob 72 rotates shaft 74. Two threaded portions 96, 98 on shaft 74 are of opposite hands and screw threadedly engage female threads on carriers 76 and 78 whereby rotation of knob 72 about its axis 100 causes movement of carriers 76, 78 in opposite directions i.e. towards or away from each other. The pitch of the threaded portions 96, 98 is 56 turns per inch, which is a relatively high ratio drive whereby the knob offers a means of fine adjustment of the positions of the carriers. The latter are slidably mounted on guide pins 80, 82 which are secured in radially extending positions to housing 12. A coiled compression spring 102 acts between a head portion 104 of housing 12 and outer carrier 76 to hold the assembly in any selected adjusted position.

Singulator members 84 to 94 are cylindrical in form and arranged in pairs 84, 86; 88, 90; and 92, 94. The members of each pair are radially and circumferentially offset so that the rows 40, 42 and 44 of apertures 34 can pass between the members of each pair. Adjustment of knob 72 causes the singulator members of each pair to move towards or away from its row of seed selection apertures.

As can be seen in FIG. 4, the singulator members make flat face-to-face contact with seed selection plate 18.

The seed ejection means 22 comprises a vacuum cut off plate 106 against which the vacuum side of plate 18 runs, whereby the seeds are no longer held by the vacuum. This causes the seeds to fall from the plate by gravity.

In use, seed reservoir 14 is full of seed and drive 16 rotates seed selection plate 18 about axis 46 in the clockwise direction as seen in FIG. 1. Seed is picked up at seed selection zone 32, excess seeds are doffed by singulation mechanism 20 and the seeds are dispensed one-by-one at cut off plate 22 straight into the furrow opened by the coulter (not shown). The arrangement is such that the seeds from each of the rows 40, 42, 44 of apertures are delivered to individual furrows in the soil.

By virtue of the fact that seed selection plate 18 is of thickness only 0.254 millimeters as compared with the conventional disc thickness of 1.55 millimeters, it is very much more flexible than a conventional seed selection disc and is deformed by the vacuum applied to the vacuum side of the disc so as to effect a degree of self-sealing with respect to the circular support ribs 60, 62 and 64 and the outer periphery of turntable 54. Thus, the outer portion of plate 18 together with the turntable and the ribs and the vacuum side body member 24 form a substantially airtight vacuum chamber from which air is evacuated by the vacuum pump and to which, to a first approximation, air can only be admitted through the apertures 34. Thus, the vacuum applied to plate 18 is easily maintained, is substantially constant around the whole circumference of the apparatus and is mainly uneffected by minor irregularities in the housing.

As regards the seed selection apertures 34 themselves, these are particularly smooth and regular with no burrs, swarf or other irregularities to interfere with the selection and retention of seeds. The apertures are formed chemically whereby each aperture has a smooth rounded profile. Moreover, no mechanical action is involved in the formation of the apertures and hence no corresponding distortion of the disc occurs.

Singulation mechanism 20 is adjusted by means of knob 72 to achieve the maximum singulation effect. By adjusting the throat defined by the two singulation members of each pair, the point can be reached where all the excess seeds from a high proportion of the apertures 34 are removed before the seeds reach the seed release zone.

In FIGS. 7 to 12 there are shown a variety of singulator member forms. Those of FIGS. 7 and 8 are the same as those of FIG. 6, being generally cylindrical in form. In FIGS. 9 and 10 is shown a generally frustoconical form of singulator member 108 in which the larger face 110 contacts disc 18.

In the embodiments of FIGS. 11 and 12, the singulator members are of thin plate-like form and mounted on the carrier members by bonding onto the bases of the cylindrical (or other shape) members thereon. These plate-like singulator members exert a lifting effect on the seed to produce the desired effect. In both cases, the singulator members present a curved profile to the seed and define an adjustable throat through which the rows of seed apertures pass.

Many modifications can be made in the above-described embodiments without departing from the scope of the invention, including variation of the size, thickness and material of the seed selection plate 18. For example, the diameter of the plate is chosen to suit the size of the dispensing apparatus. One, two, three or more rows of seed apertures can be provided in it. The spacing of the rows and the spacing of the apertures in each row can be varied according to the seed requirements. The apertures need not be radially aligned. The size of each aperture can likewise be varied to suit the seed.

As regards the material of the disc, stainless steel is preferred in that it has good corrosion resistance and static electricity effects are avoided. However, with the advent of new materials, it may be possible to provide a relatively flexible disc which does not suffer from electro static problems and which is not entirely formed of metallic material.

The range of thickness of the disc, measured between its opposite sides, so far as metals such as stainless steel are concerned is from 0.125 to 0.625 millimeters with the range of 0.2 to 0.3 millimeters being preferred.

It may be desired to provide means to reduce friction and wear between the plate and its supports, such as a layer of polytetrafluoroethylene or graphite or carbon or other lubricating materials.

The invention may also be adapted for use with seed selection mechanisms whereby the pressure differential is generated by raising the pressure on the seed side of the disc to above atmospheric pressure.

In the singulation mechanism, more than one singulator or member may be provided on each side of each row and other shapes of singulator member may be adopted.

Furthermore, it is to be understood that of course on a theoretical basis any degree of vacuum will cause a corresponding degree of deflection of a seed selection plate if applied thereto. Such deformation is not normally enough to improve the sealing of the disc at all.

Other methods of non-mechanical generation of the seed apertures may be provided, and the invention provides a method of making a seed selection plate by such methods.

By the term "singulation" as used in this specification it is to be understood that the term does not necessarily refer to the production of the optimum situation where only one seed remains in each seed selection aperture. This result depends very much on the careful adjustment of the mechanism. Accordingly, the term "singulation" is intended to refer to the reduction in the number of "doubles" and "triples" in the seed apertures. Moreover, for this purpose, the embodiments of FIGS. 11 and 12 have been tested with plate thicknesses from 10 to 30 thousands of an inch (0.254 millimeters to 0.762 millimeters).

I claim:

1. A seed selection plate for a differential pressure seed selection mechanism, the plate having spaced seed selection apertures therein characterized in that the seed selection plate comprises stainless steel having a thickness between 0.125 millimeters and 0.625 millimeters and a flexibility such that the plate deforms under the pneumatic pressure differential applied thereto to provide a degree of self sealing, the plate having smooth walled seed apertures therein devoid of burrs and other irregularities resulting from mechanical aperture formation.

2. A seed dispensing mechanism for an agricultural precision drill or planter, the seed dispensing mechanism comprising:
   a housing;
   a seed supply in the housing;
   a seed outlet formed in the housing at a location spaced from said seed supply;
   a seed selection disc;
   central rotatable drive and support means for said seed selection disc located within the housing;
   said seed selection disc having a plurality of circumferentially spaced seed selection apertures formed therein and positioned to pass through said seed supply as the disc rotates and thereby to be exposed to the seeds in said supply on one side of the disc; radially spaced and circumferentially extending support means for the disc located at the other lateral side thereof from said one side, the radially spaced support means having generally flat faces for sliding engagement with said other side of the disc as the disc rotates and being positioned on opposite radially spaced sides of said plurality of seed selection apertures formed in the disc;
   a source of pressure differential to be applied to opposite sides of the seed selection disc to cause seeds from said supply to be selected therefrom and held in said seed selection apertures as said disc rotates;
   a seed agitator member and drive means therefor, the agitator member being located in said seed supply within said housing and in the region thereof where seeds enter said seed apertures formed in said seed selection disc; and
   seed release means to release seeds from said seed selection disc into said seed outlet, whereby seeds are selected from said supply in said seed apertures and are transported by rotation of said disc in use to said seed outlet; characterised in that said pressure differential is a vacuum of less than one atmosphere applied to said other side of said disc and being sufficient to permit effective seed selection and seed release by said disc; and said seed selection disc comprises a corrosion resistant metallic material having a thickness measure between its opposite side faces of from 0.0049 inches (0.125 millimeters) to 0.0246 inches (0.0625 millimeters) and the flexibility of said disc being such that the disc flexes under the action of said vacuum so as to seal against said radially spaced support means and continuously flexes under the action of said vacuum to accommodate minor irregularities in the form of departures from a perfectly flat condition of said radially spaced faces of said support means as the disc rotates, thereby to reduce localised variations in said pressure differential across the disc.

3. A seed dispensing mechanism for an agricultural precision drill or planter, the seed dispensing mechanism comprising:

a housing;

a seed supply in the housing;

a seed oulet formed in the housing at a location spaced from said seed supply;

a seed selection disc;

central rotatable drive and support means for said seed selection disc located within the housing;

said seed selection disc having a plurality of circumferentially spaced seed selection apertures formed therein and positioned to pass through said seed supply as the disc rotates and thereby to be exposed to the seeds in said supply on one side of the disc; radially spaced and circumferentially extending support means for the disc located at the other lateral side thereof from said one side, the radially spaced support means having generally flat faces for sliding engagement with said other side of the disc as the disc rotates and being positioned on opposite radially spaced sides of said plurality of seed selection apertures formed in the disc;

a source of pressure differential to be applied to opposite sides of the seed selection disc to cause seeds from said supply to be selected therefrom and held in said seed selection apertures as said disc rotates;

a seed agitator member and drive means therefor, the agitator member being located in said seed supply within said housing and in the region thereof where seeds enter said seed apertures formed in said seed selection disc; and seed release means to release seeds from said seed selection disc into said seed outlet, whereby seeds are selected from said supply in said seed apertures and are transported by rotation of said disc in use to said seed outlet; characterised in that said pressure differential is a vacuum of less than one atmosphere applied to said other side of said disc and being sufficient to permit effective seed selection and seed release by said disc;

said seed selection disc comprises stainless steel having a thickness measured between its opposite side faces of from 0.0049 (0.125 millimeters) to 0.0246 inches (0.0625 millimeters) and the flexibility of said disc being such that the disc flexes under the action of said vacuum so as to seal against said radially spaced support means and continuously flexes under the action of said vacuum to accommodate minor irregularities in the form of departures from a perfectly flat condition of said radially spaced faces of said support means as the disc rotates, thereby to reduce localised variations in said pressure differential across the disc; and said seed apertures having been formed by chemical etching whereby the apertures each have a smooth rounded profile.

4. A seed dispensing mechanism for an agricultural precision drill or planter, the seed dispensing mechanism comprising:

a housing;

a seed supply in the housing;

a seed outlet formed in the housing at a location spaced from said seed supply;

a seed selection disc;

central rotatable drive and support means for said seed selection disc located within the housing;

said seed selection disc having a plurality of circumferentially spaced seed selection apertures formed therein and positioned to pass through said seed supply as the disc rotates and thereby to be exposed to the seeds in said supply on one side of the disc; radially spaced and circumferentially extending support means for the disc located at the other lateral side thereof from said one side, the radially spaced support means having generally flat faces for sliding engagement with said other side of the disc as the disc rotates and being positioned on opposite radially spaced sides of said plurality of seed selection apertures formed in the disc;

a source of pressure differential to be applied to opposite sides of the seed selection disc to cause seeds from said supply to be selected therefrom and held in said seed selection apertures as said disc rotates;

a seed agitator member and drive means therefor, the agitator member being located in said seed supply within said housing and in the region thereof where seeds enter said seed apertures formed in said seed selection disc; and seed release means to release seeds from said seed selection disc into said seed outlet, whereby seeds are selected from said supply in said seed apertures and are transported by rotation of said disc in use to said seed outlet; characterised in that said pressure differential is a vacuum of less than one atmosphere applied to said other side of said disc and being sufficient to permit effective seed selection and seed release by said disc;

said seed selection disc comprises a corrosion resistant flexible material, and the flexibility of said disc being such that the disc flexes under the action of said vacuum so as to seal against said radially spaced support means and continuously flexes under the action of said vacuum to accommodate minor irregularities in the form of departures from a perfectly flat condition of said radially spaced faces of said support means as the disc rotates, thereby to reduce localised variations in said pressure differential across the disc; and said seed selection apertures being arranged in at least two radially spaced rows, and said radially spaced support means for the disc located at said other lateral side thereof comprising at least three radially spaced annular member positioned for sliding engagement with the disc so that said rows of seed selection apertures pass between said annular members.

5. A seed dispensing mechanism for an agricultural precision drill or planter, the seed dispensing mechanism comprising:
a housing;
a seed supply in the housing;
a seed outlet formed in the housing at a location spaced from said seed supply;
a seed selection disc;
central rotatable drive and support means for said seed selection disc located within the housing;
said seed selection disc having a plurality of circumferentially spaced seed selection apertures formed therein and positioned to pass through said seed suply as the disc rotates and thereby to be exposed to the seeds in said supply on one side of the disc; radially spaced and circumferentially extending support means for the disc located at the other lateral side thereof from said one side, the radially spaced support means having generally flat faces for sliding engagement with said other side of the disc as the disc rotates and being positioned on opposite radially spaced sides of said plurality of seed selection apertures formed in the disc;
a source of pressure differential to be applied to opposite sides of the seed selection disc to cause seeds from said supply to be selected therefrom and held in said seed selection apertures as said disc rotates;
a seed agitator member and drive means therefor, the agitator member being located in said seed supply within said housing and in the region thereof where seeds enter said seed apertures formed in said seed selection disc; and
seed release means to release seeds from said seed selection disc into said seed outlet, whereby seeds are selected from said supply in said seed apertures and are transported by rotation of said disc in use to said seed outlet; characterised in that
said pressure differential is a vacuum of less than one atmosphere applied to said other side of said disc and being sufficient to permit effective seed selection and seed release by said disc;
said seed selection disc comprises stainless steel having a thickness measured between its opposite side faces of from 0.0079 inches (0.2 millimeters) or 0.0118 inches (0.3 millimeters) and the flexibility of said disc being such that the disc flexes under the action of said vacuum so as to seal against said radially spaced support means and continuously flexes under the action of said vacuum to accommodate minor irregularities in the form of departures from a perfectly flat condition of said radially spaced faces of said support means as the disc rotates, thereby to reduce localised variations in said pressure differential across the disc.

6. A seed dispensing machanism for an agricultural precision drill or planter, the seed dispensing mechanism comprising:
a housing;
a seed supply in the housing;
a seed outlet formed in the housing at a location spaced from said seed supply;
a seed selection disc;
central rotatable drive and support means for said seed selection disc located within the housing;
said seed selection disc having a plurality of circumferentially spaced seed selection apertures formed therein and positioned to pass through said seed supply as the disc rotates and thereby to be exposed to the seeds in said supply on one side of the disc; radially spaced and circumferentially extending support means for the disc located at the other lateral side thereof from said one side, the radially spaced support means having generally flat faces for sliding engagement with said other side of the disc as the disc rotates and being positioned on opposite radially spaced sides of said plurality of seed selection apertures formed in the disc;
a source of pressure differential to be applied to opposite sides of the seed selection disc to cause seeds from said supply to be selected therefrom and held in said seed selection apertures as said disc rotates;
a seed agitator member and drive means therefor, the agitator member being located in said seed supply within said housing and in the region thereof where seeds enter said seed apertures formed in said seed selection disc; and
seed release means to release seeds from said seed selection disc into said seed outlet, whereby seeds are selected from said supply in said seed apertures and are transported by rotation of said disc in use to said seed outlet; characterised in that
said pressure differential is a vacuum of less than one atmosphere applied to said other side of said disc and being sufficient to permit effective seed selection and seed release by said disc;
said seed selection disc comprises stainless steel having a thickness measured between its opposite side faces of from 0.0049 inches (0.125 millimeters) to 0.0246 inches (0.625 millimeters) and the flexibility of said disc being such that the disc flexes under the action of said vacuum so as to seal against said radially spaced support means and continuously flexes under the action of said vacuum to accommodate minor irregularities in the form of departures from a perfectly flat condition of said radially spaced faces of said support means as the disc rotates, thereby to reduce localised variations in said pressure differential across the disc; and
said seed release means comprising a blanking plate located at said other side of said disc to cut off said seed selection apertures from said source of vacuum.

* * * * *